(12) United States Patent
Paterson

(10) Patent No.: US 6,301,221 B1
(45) Date of Patent: Oct. 9, 2001

(54) METHODS AND APPARATUS FOR ENCODING DATA

(75) Inventor: Kenneth Graham Paterson, Bristol (GB)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/138,599

(22) Filed: Aug. 22, 1998

(30) Foreign Application Priority Data

Sep. 10, 1997 (GB) .................................................. 9719210
Dec. 10, 1997 (EP) .................................................. 97309943

(51) Int. Cl.⁷ .................................................. H04J 11/00

(52) U.S. Cl. .......................... 370/208; 370/206; 370/210; 375/146

(58) Field of Search .................................... 370/203, 208, 370/210, 328, 329, 330, 478, 206; 375/140, 141, 146

(56) References Cited

U.S. PATENT DOCUMENTS

| | | | | |
|---|---|---|---|---|
| 5,425,050 | * | 6/1995 | Schreiber et al. | 375/141 |
| 5,610,908 | * | 3/1997 | Shelsvell et al. | 370/210 |
| 5,694,389 | * | 12/1997 | Seki et al. | 370/208 |
| 5,784,363 | * | 7/1998 | Engstrom et al. | 370/332 |
| 5,953,311 | * | 9/1999 | Davies et al. | 370/210 |

OTHER PUBLICATIONS

Jones A. E. Et Al.: "Block Coding Scheme For Reduction Of Peak–To–Mean Envelope Power Ratio Of Multicarrier Transmission Schemes" Electronics Letters, GB, IEE Stevenage, vol. 30, No. 25, Dec. 8, 1994 pp. 2098–2099. XP000501846 ISSN: 0013–5194.

Davis J. A. et al.: "Peak to Mean Power Control and Error Correction for OFDM Transmission Using Golay Sequences and Reed–Muller Codes" Electronics Letters, GB IEE Stevenage, vol. 33, No. 4 Feb. 13, 1997 (1997–02–13), pp. 267–268 XP002066279 ISSN: 0013–5194.

Davis, James et al.: "Peak to Mean Power Control in OFDM, Golay Complementary Sequences and Reed Muller Codes" HP Laboratories Technical Report, XX, XX vol. HPL–97–158, Dec. 1997 (1997–12), pp. 1–26, XP002099551.

Electronics Letters, vol. 30, No. 25, pp. 2098–2099, A.E. Jones et al., "Block Coding Scheme for Reduction of Peak to Mean Envelope Power Ration of Multicarrier Transmission Schemes".

1995 IEEE, Jul. 25, 1995, pp. 825–829, T. A. Wilkinson, "Minimisation of the Peak to Mean Envelope Power Ratio of Multicarrier Transmission Schemes by Block Coding".

(List continued on next page.)

*Primary Examiner*—Ajit Patel
*Assistant Examiner*—Bob A. Phunkulh

(57) ABSTRACT

In a coded orthogonal frequency division multiplex (COFDM) system n-bit data words are encoded as $m$-symbol code words (binary, quaternary, octary, etc.). The code words are selected for desired low peak-to-mean envelope power ratio (PMEPR) characteristics of transmissions over a COFDM channel, from a set of cosets of a linear sub-code of a code having a specified generator matrix. The code words thus identified by the procedure described can, even for values of m in excess of 3, simultaneously limit the PMEPR to a known value, provide specified error control characteristics, be implemented in a feasible manner using analytical circuit techniques (e.g. with combinatorial logic), and include sufficiently many different code words to enable data to be transferred at useful rates. In particular, sets of cosets can be identified without calculating the maximum peak envelope power over each coset. Various selections of code words can be made, enabling a reduced error detection capability to be accepted in order to obtain a higher data transfer rate.

16 Claims, 4 Drawing Sheets

OTHER PUBLICATIONS

1996 IEEE, Apr. 28, 1996, pp. 904–908, T. A. Wilkinson, "Combined Coding for Error Control and Increased Robustness to System Non-linearities in OFDM".

IEEE Trans. On Communications, vol. 39, No. 7, pp. 1031–1033 B. M. Popovic, "Synthesis of Power Efficient Multitone Signals with Flat Amplitude Spectrum".

IEEE Trans. On Information Theory, vol. IT–32, No. 1, Jan. 1986 pp. 41–50, "Soft Decoding Techniques for Codes and Lattices, Including the Golay Code and the Leech Lattice".

IRE Trans. On Information Theory, Apr. 1961, pp. 82–87, M. J. E. Golay, "Complementary Series".

* cited by examiner

METHODS AND APPARATUS FOR ENCODING DATA

TECHNICAL FIELD

This invention relates to methods and apparatus for encoding data, and to communications systems incorporating such methods and apparatus; in particular, though not exclusively, the invention relates to such methods, apparatus and systems for transmitting data using multi-carrier frequency division multiplexing, such as coded orthogonal frequency division multiplexing (COFDM).

BACKGROUND ART

The increasingly widespread use of powerful computer-based equipment and appliances is resulting in rapidly increasing requirements for high-speed, high-capacity communications, based on both wireline and wireless techniques. One way of accommodating this increase is to design communications systems for operation at higher and higher symbol rates. However, an increase in symbol rate typically involves a corresponding decrease in inter-symbol spacing, and this in turn can lead to greater inter-symbol interference (ISI) and consequential errors in symbols as received. In the case of wireline links ISI can arise, for example, from signal reflections at imperfectly matched interfaces between different portions of the communications link. For wireless links a significant source of ISI is multi-path propagation involving signal reflections from objects (such as buildings) in the space traversed by the signals; mobile wireless communications can be especially susceptible to ISI from this source, because movement of a mobile unit using the link can cause continuous and complex variation in the multiple propagation paths extending to the mobile unit.

A technique which is being actively studied and developed to increase communications system capacity and counteract ISI is multi carrier (or multitone) frequency division multiplex operation, such as COFDM operation. In a COFDM system multiple symbols are transmitted simultaneously, each symbol controlling the modulation (e.g. by phase-shift keying) of a respective one of multiple carrier signals having closely-spaced frequencies. By choosing the carrier-frequency spacing to have an appropriate relationship to the rate at which symbols are transmitted on each carrier, it is possible to ensure that each individual carrier can be demodulated without interference from the carriers adjacent to it (in which case the carriers are said to be orthogonal to one another). The set of symbols transmitted simultaneously on respective carriers during a symbol period (a code word) is chosen to encode a group of data symbols (a data word) and includes redundancy (i.e. the code word has more symbols than the data word); this redundancy is used upon reception for detection of errors in the symbols as received, and, if desired, for correction of those errors.

COFDM systems counteract ISI in part because the transmission of multiple symbols in parallel enables a desired data rate to be attained with a lower symbol rate than would be necessary if a serial system were used to transmit individual symbols in succession. A lower symbol rate implies a longer duration for each symbol and thus a longer period between symbol transitions, which reduces the impact of ISI. The error detection and correction capabilities provided by the inclusion of redundancy enhance the resistance to data corruption, by enabling some errors which occur in received symbols owing to signal fading and other causes to be detected and corrected.

However, present COFDM systems encounter difficulties in obtaining the maximum potential benefit for a particular transmitted signal power, owing to limitations arising from the typical peak-to-mean envelope power ratio (PMEPR) of the complex-valued signal from which the actual transmitted signal is derived. Because this transmitted signal is effectively the sum of several signals at closely spaced frequencies and with respective phases which change at each symbol transition, the overall signal tends to exhibit transient pronounced peaks separated by substantially longer intervals of much lower though still varying amplitude. The transmitting equipment must be adjusted to reproduce the peaks without clipping or other distortion, so for much of the time, in the intervals between peaks, that equipment is operating at a signal level well below its maximum capability. As a result the geographical range of the equipment is significantly lower than would be expected for its nominal power rating, or alternatively a much more powerful equipment must be provided to cover the desired range and then operated inefficiently.

It is known that this problem can in principle be alleviated by careful selection of the code words which encode the possible data words (for example in 'Block coding scheme for reduction of peak to mean envelope power ratio of multicarrier transmission schemes' by A. E. Jones, T. A. Wilninson and S. K. Barton, *Electronics Letters*, 8th December 1994, vol. 30, no.25, pp. 2098–2099). However, in selecting code words to reduce the PMEPR it is important also to ensure the code has good error correction properties. Furthermore, implementation of a high-throughput communications system desirably involves the use of long code words and of rapid encoding and decoding procedures; the use of simple look-up tables, though readily implemented, does not lend itself to rapid operation using compact (and low-power, inexpensive) circuitry, especially during decoding, if the number of valid code words to be checked is large, as is typically the case with long code words (e.g. more than about 16 symbols). It is therefore preferable for encoding and decoding operations to be definable in terms of some analytical procedure which for example performs combinatorial logic on the data word or code word symbols to convert one to the other, or at least restricts the size of any look-up table which is used.

An additional difficulty is presented by the sheer quantity of possible code words from which a selection may be made to define a code for use in a typical system. As the number of symbols in a code word increases the number of possible code words increases much faster, even for binary symbols; for symbols having just three (ternary) or four (quaternary) possible values, the number of possible codes available becomes so huge even for quite short code words that a simple exhaustive search through all possible code words is not feasible in a realistic time even just to minimize the PMEPR. Attempting to satisfy error correction and implementational requirements as well merely adds to the difficulty of such a search, especially as it will not even be known whether there actually exists a code word set which is of the desired size and which simultaneously satisfies preferred criteria relating to PMEPR, error detection or correction and ease of encoding and decoding. This difficulty is further exacerbated by the desirability of having a large number of code words available for use in the chosen code, in order to be able to encode a large number of different data words (i.e. data words containing relatively many symbols) and thus attain an acceptably high data transfer rate.

It is known that certain kinds of codes may have some desirable properties. Thus the paper 'Synthesis of Power Efficient Multitone Signals with Flat Amplitude Spectrum' by B. M. Popović, *IEEE Transactions on Communications*, vol. 39, no.7, July 1991, pp.1031–1033 indicates that any binary or polyphase complementary sequence can be used to construct a multitone signal such that the crest factor of the real-valued signal is less than or equal to 6 dBV (which corresponds to the PMEPR of the complex-valued signal being less than or equal to 3 dB). Examples of these sequences have been described, as in the case of binary Golay complementary sequence pairs ('Complementary series' by M. J. E. Golay, *IRE Transactions on Information Theory*, vol. IT-7, April 1961, pp. 82–87). However, Popovic̈'s paper is directed to situations such as multipath fading measurements and multitone jamming, in which a single code word can be used continuously in generating the required signal. Accordingly Popović gives no guidance on how multiple such sequences could be identified just to attain the 6 dBV limit on PMEPR in a practical code for conveying information; and no mention whatsoever is made of the other requirements mentioned above for a code suitable for practical implementation. Indeed Popović states that "the construction of multitone signals having minimum peak-to-peak amplitude is an old problem that still has no analytical solution".

It should be noted that Golay complementary sequence pairs and codes defined using them are different from and should not be confused with so-called Golay codes; Golay complementary sequence pairs and Golay codes were first defined, independently of one another, by the same researcher and for that reason alone both are referred to by his name.

Methods and apparatus for encoding and decoding are described in International patent application no. PCT/IGB 97/02 464, in which a substantial number of different code words are identifiable in practice, despite the potentially huge search space of possible code words, and which provide a predictable low limit on PMEPR, have specified error detection and correction properties and are feasible for implementation in high-speed circuitry. Some of the techniques described therein, for ordering cosets of code words according to associated PMEPR, can involve substantial amounts of computation.

It is an object of this invention to enable identification of large numbers of cosets of code words which will yield a PMEPR not greater than a predetermined threshold, without the need for extensive computation of peak envelope power over each coset.

DISCLOSURE OF INVENTION

According to one aspect of this invention there is provided a method of encoding data words as $2^m$ symbol code words where $m \geq 3$, each code word symbol having q different possible values where q is an even integer greater than 1, for transmission using multi-carrier frequency division multiplexing, such as coded orthogonal frequency division multiplexing (COFDM), wherein data words are encoded in accordance with their value and code words selected in complete cosets, for a peak-to-mean envelope power ratio of said transmission not greater than a predetermined threshold of $2^{p+1}$ for any fixed integer p where $1 \leq p \leq m-2$, from a set of one or more cosets of a linear sub-code of a code having a generator matrix as follows:

$$((2.0+1) \times 2^m)/2^m \quad ((2.1+1) \times 2^m)/2^m \quad \ldots$$
$$((2.0+1) \times 2^{m-1})/2^{m-1} \quad ((2.1+1) \times 2^{m-1})/2^{m-1} \quad \ldots$$
$$\ldots$$
$$((2.0+1) \times 2^y)/2^y \quad ((2.1+1) \times 2^y)/2^y \quad \ldots$$
$$\ldots$$
$$((2.0+1) \times 2^1)/2^1 \quad ((2.1+1) \times 2^1)/2^1 \quad \ldots$$
$$((2.0+1) \times 2^0)/2^0 \quad ((2.1+1) \times 2^0)/2^0 \quad \ldots$$

$$((2.z+1) \times 2^m)/2^m \quad \ldots \quad ((2.(2^m-1)+1) \times 2^m)/2^m$$
$$((2.z+1) \times 2^{m-1})/2^{m-1} \quad \ldots \quad ((2.(2^m-1)+1) \times 2^{m-1})/2^{m-1}$$
$$((2.z+1) \times 2^y)/2^y \quad \ldots \quad ((2.(2^m-1)+1) \times 2^y)2^y$$
$$((2.z+1) \times 2^1)/2^1 \quad \ldots \quad ((2.(2^m-1)+1) \times 2^1)/2^1$$
$$((2.z+1) \times 2^0)/2^0 \quad \ldots \quad ((2.(2^m-1)+1) \times 2^0)/2^0$$

where z has integer values from 0 to $2^m-1$, y has integer values from m to 0, x indicates bitwise multiplication of factors expressed as (m+1)-bit binary numbers, and the result of division is expressed as a single digit;

wherein all coset representatives of cosets in said set of cosets have the form $$(q/2)(X_1 * X_2) \oplus (q/2)(X_2 * X_3) \oplus \ldots \oplus (q/2)(X_{m-p-1} * X_{m-p}) \oplus$$
$$v_{1,1}(X_1 * X_{m-p+1}) \oplus v_{1,2}(X_2 * X_{m-p+1}) \oplus \ldots \oplus v_{1,m-p}(X_{m-p} * X_{m-p+1}) \oplus$$
$$v_{2,1}(X_1 * X_{m-p+2}) \oplus v_{2,2}(X_2 * X_{m-p+2}) \oplus \ldots \oplus v_{2,m-p}(X_{m-p} * X_{m-p+2}) \oplus$$
$$\ldots$$
$$v_{p,1}(X_1 * X_m) \oplus v_{p,2}(X_2 * X_m) \oplus \ldots \oplus v_{p,m-p}(X_{m-p} * X_m) \oplus$$
$$w_{1,2}(X_{m-p+1} * X_{m-p+2}) \oplus$$
$$w_{1,3}(X_{m-p+1} * X_{m-p+3}) \oplus w_{2,3}(X_{m-p+2} * X_{m-p+3}) \oplus$$
$$w_{1,4}(X_{m-p+1} * X_{m-p+4}) \oplus w_{2,4}(X_{m-p+2} * X_{m-p+4}) \oplus$$
$$w_{3,4}(X_{m-p+3} * X_{m-p+4}) \oplus$$
$$\ldots$$
$$w_{1,p}(X_{m-p+1} * X_m) \oplus w_{2,p}(X_{m-p+2} * X_m) \oplus \ldots \oplus w_{p-1,p}(X_{m-1} * X_m)$$

or a form derived therefrom by a permutation of the subscripts of the terms $X_1$ to $X_m$, where $X_1$ to $X_m$ are row labels of the first m rows in the generator matrix, terms of the form $v_{p,m-p}(X_{m-p}*X_m)$ indicate derivation of a word by symbol-wise multiplication of rows such as $X_{m-p}$ and $X_m$ followed by symbol-wise multiplication modulo q of such word by a respective coefficient such as $v_{p,m-p}$, $\oplus$ indicates symbol-wise addition of words modulo q, and the coefficients $V_{i,j}$ for $1 \leq i \leq p$ and $1 \leq j \leq m-p$ and the coefficients $w_{i,j}$ for $1 \leq i < j \leq p$ have integer values chosen from the range 0 to q-1.

BRIEF DESCRIPTION OF DRAWINGS

Methods and apparatus for encoding data in accordance with this invention in communications systems for transmitting data using coded orthogonal frequency division multiplexing (COFDM) will now be described, by way of example, with reference to the accompanying drawings in which.

BEST MODE FOR CARRYING OUT THE INVENTION, & INDUSTRIAL APPLICABILITY

Figure 1:
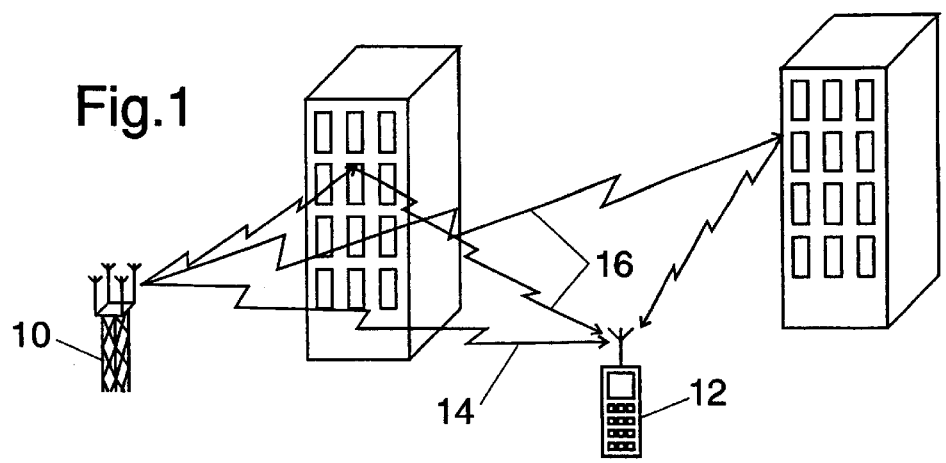
FIG. 1 illustrates multipath propagation between a base station and a mobile communications device.
Figure 2:
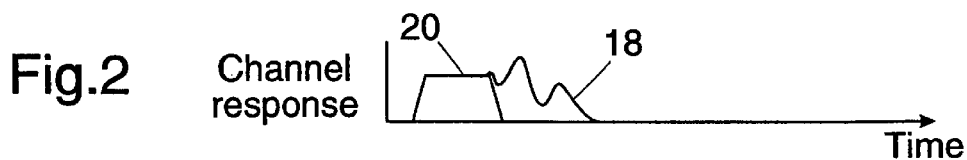
FIG. 2 is a schematic diagram showing the effect of multipath propagation on propagation of a single symbol.
Figure 3:
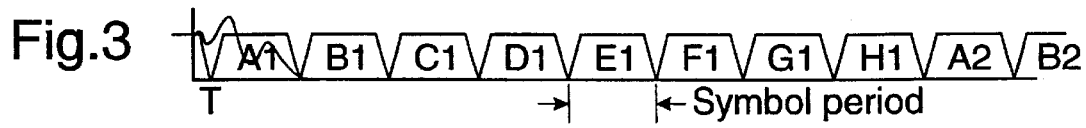
FIG. 3 is a schematic diagram showing intersymbol interference arising from multipath propagation.

FIGS. 1 to 3 illustrate in a schematic manner the problem of multipath propagation in the context of mobile communications in an urban environment. A base station 10 communicates by wireless, e.g. at microwave wavelengths, with mobile communications devices such as a mobile telephone 12. There is a direct line-of-sight signal path 14 between the base station 10 and the telephone 12, and, owing to the presence of multiple reflectors (for microwave signals) in the form of buildings and other structures, there are also multiple reflected signal paths 16. These paths are typically of differing lengths and thus involve differing propagation delays upon arrival at their destination. The overall signal as received at, for example, the mobile telephone 12 is the sum of the various signals arriving at the telephone via the different paths.

The transmitted signal may be considered as comprising a succession of symbols modulating a carrier wave (e.g. by phase-shift keying). As shown in FIG. 2, a consequence of signals traversing multiple paths with different propagation delays is that the composite signal 18 as received for a symbol is not an accurate replica of the signal 20 as transmitted for that symbol. In particular the received composite signal is typically longer in duration than the transmitted signal, and has a trailing portion with a significant amplitude after the point when an accurate replica of the transmitted signal would have terminated. If this trailing portion extends for a significant fraction of a symbol period, as shown in FIG. 3 for the pulse nominally terminating at time T, the trailing portion will overlap and interfere with reception of the following symbol. As a result that following symbol may be incorrectly received, i.e. the value detected for it in the receiver may not correctly represent the value as transmitted, even in the absence of other noise sources. Signal corruption of this kind is known as intersymbol interference (ISI).

Figure 4A:
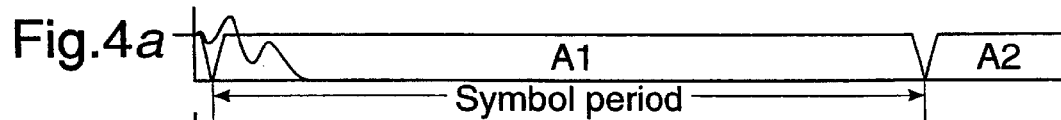
FIGS. 4a to 4h are schematic diagrams showing reduction in intersymbol interference by the use of multi-carrier frequency division multiplexing.
Figure 4B:
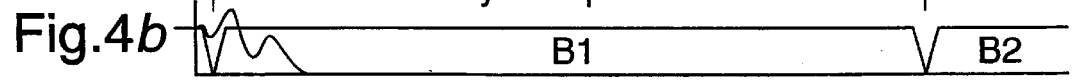
Figure 4C:
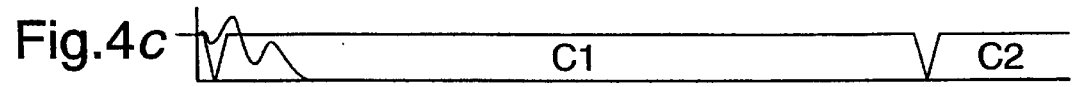
Figure 4D:
Figure 4E:
Figure 4F:
Figure 4G:
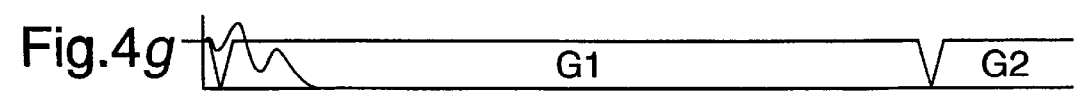
Figure 4H:
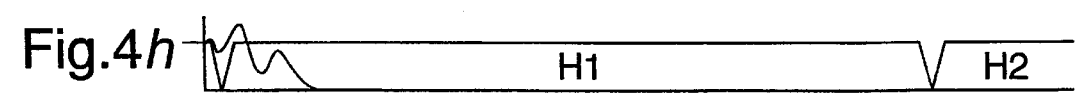

The effects of ISI can be alleviated by extending the duration of the transmitted symbols, as shown in FIG. 4a, so that each symbol as received extends beyond the trailing portion arising from multipath propagation delays. To counteract the reduction in symbol rate which would ensue, it has been proposed to transmit multiple symbols simultaneously, each modulating a respective one of multiple carrier waves. Thus if eight carriers are used, as shown in FIGS. 4a to 4h, the symbol period on each carrier can be eight times that which would be necessary with a single carrier (as shown in FIG. 3) while maintaining the same overall symbol rate. If the frequency spacing between the multiple carriers is an integer multiple of the inverse of the symbol period, it is possible to recover the individual symbol stream modulating each of the carriers without interference from the other carriers. This technique is known as orthogonal frequency division multiplexing (OFDM).

Figure 5:
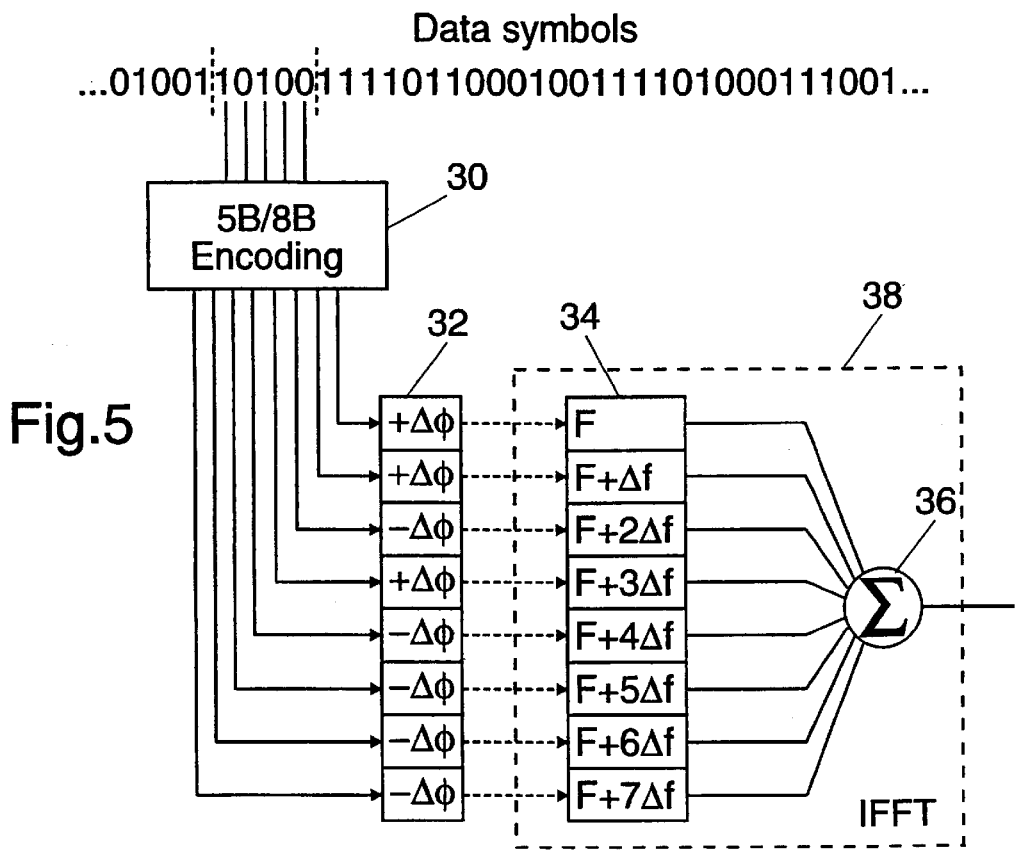
FIG. 5 shows an encoder and modulator for use in a COFDM system.

In addition to the use of multiple carriers, it has also been proposed to provide additional error detection and correction capabilities by the use of block encoding. Thus, as shown in FIG. 5, a serial stream of data symbols (binary symbols in this example) is notionally divided into successive groups or words each containing five symbols. A group of five symbols is input to a five-bit to eight-bit (5B/8B) encoder 30 which outputs a corresponding eight-bit code word. This code word is applied to a bank of eight phase shift controllers 32 which control a bank of eight oscillators 34 producing carrier signals at eight successive frequencies at intervals $\Delta f$ apart. Each individual bit in the code word causes a respective phase shift controller to impose either a positive or negative phase shift $\Delta\phi$ to modulate the carrier signal produced by the respective oscillator, depending on the current value of that bit.

Figure 6:
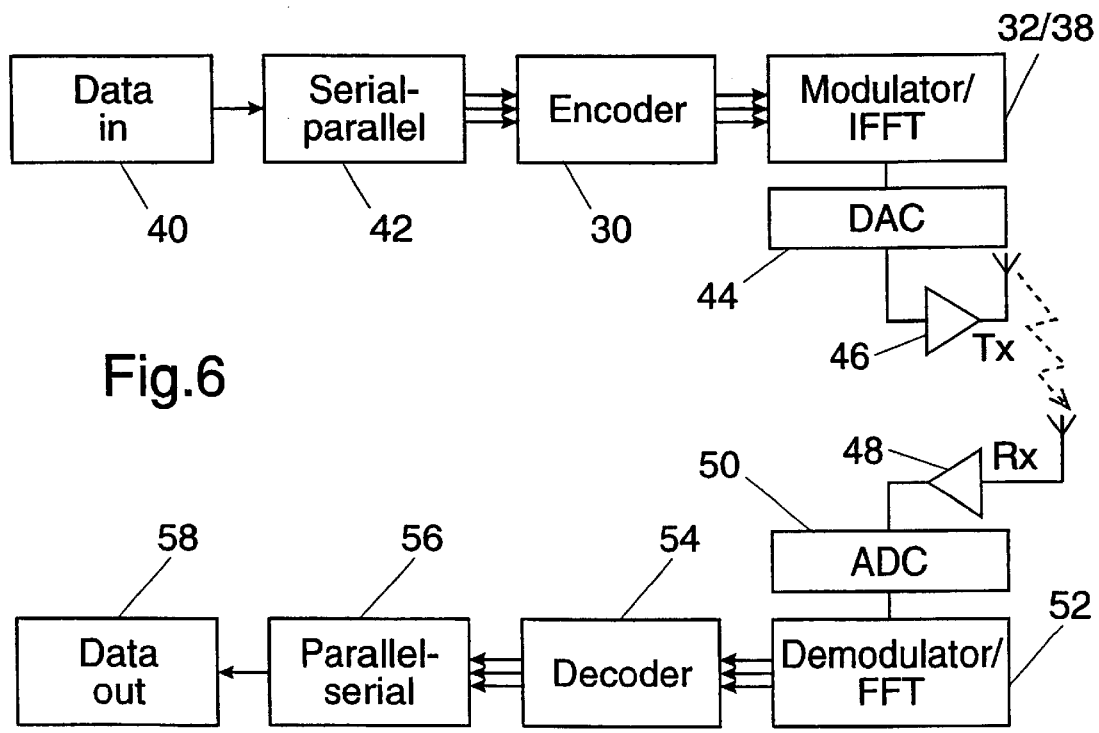
FIG. 6 is a block schematic diagram of a COFDM system incorporating the encoder and modulator of FIG. 5.

The modulated outputs of the oscillators 34 are combined in an adder 36 to produce the transmitted signal. In practice the functions of the oscillators 34 and the adder 36 are conveniently combined in a digital signal processor implementing an inverse fast Fourier transform (IFFM), as indicated by the dashed box 38. Thus, as shown schematically in FIG. 6, data to be transmitted are received in block 40 and converted to parallel form in a serial-to-parallel converter 42. The parallel data are encoded in encoder 30, as described above, and the encoded data control generation of the multi-carrier signal in the modulator/IFFT 32/38. This multi-carrier signal is converted to analogue form in a D-A converter 44, amplified and transmitted by a transmitter 46.

Reception is essentially a reverse of this process: the signal is received and amplified by a receiver 48, and then converted to digital form by an A-D converter 50. The digital signal is supplied to a demodulator 52 which comprises a digital signal processor implementing the fast Fourier transform (FFT) to separate and demodulate the component signals in the composite multicarrier signal. The demodulated data are passed to a decoder 54 which reverses the encoding applied by the encoder 30, and typically also performs error detection and correction functions. Thereafter a parallel-to-serial converter 56 changes the data into serial form to be output at block 58.

Figure 7:
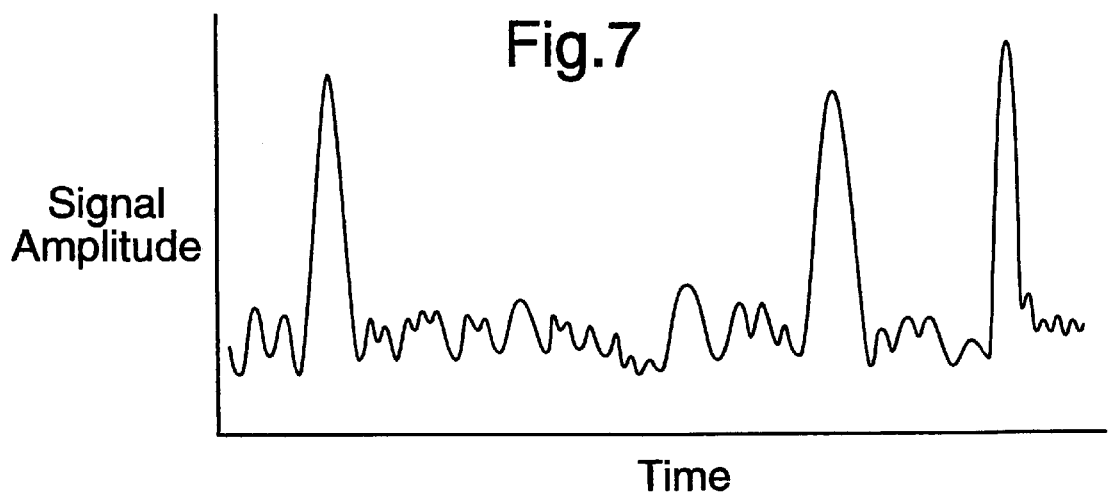
FIG. 7 illustrates the general form of a COFDM signal waveform without any limitation of PMEPR.

The choice of code which is implemented by the encoder 30 has significant implications for the efficient operation of the transmitter 46. A multicarrier signal comprises the sum of several sinusoidal waves with equal amplitudes and equally spaced frequencies. As a result, the maximum absolute value of the composite signal is strongly sensitive to the relative phases of the component sinusoids. These relative phases are changed at the end of each symbol period by the phase shift controllers 32, according to the value of the code word to be transmitted during the next symbol period. Depending on the particular set of relative phases, and therefore on the value of the current code word, the amplitude of the transmitted signal will have occasional pronounced peaks together with intervals of much lower though still varying value, as illustrated in FIG. 7. Thus the peak-to-mean envelope power ratio of the transmitted signal is relatively high.

For such a signal to be transmitted without distortion, it is necessary for the transmitter 46 to use a linear amplifier and to operate it in a relatively inefficient manner, so that most of its dynamic range is unused except for the infrequent occasions when the amplitude of the transmitted signal reaches its peak value.

It has been proposed to reduce this problem by appropriate choice of the set of code words which are actually used to encode data for transmission. The use of block coding to avoid the use of code words which produce extreme values of PMEPR has been suggested in 'Minimisation of the peak to mean envelope power ratio of multicarrier transmission schemes by block coding' by T. A. Wilkison and A. E. Jones, 1995 *IEEE 45th Vehicular Technology Conference, July* 1995, pp. 825–829; although this proposal indicates that reductions in PMEPR are possible, it also identifies the difficulty of selecting a set of code words which both enables efficient implementation of coding and decoding and provides desired capabilities for detecting and correcting errors in the demodulated signal. Possible ways of addressing this problem are discussed, but no actual solution is presented. A modification to this approach is disclosed in 'Combined coding for error control and increased robustness to system nonlinearities in OFDM' by the same authors in 1996 *IEEE 46th Vehicular Technology Conference, April* 1996, pp. 904–908. In this modification a linear block code is chosen to provide desired properties of error correction and detection; it is proposed then to exploit the linearity and redundancy in the code to transform the code values systematically to new values which reduce the PMEPR but have equivalent error detection and correction properties. Examples are given for 4B/7B, 4B/8B and 11B/15B codes, in which the required transformation is identified by a procedure involving listing all possible code word values in order of the PMEPR for a multi-carrier signal modulated in accordance with each code word. Although such an exhaustive-search approach is feasible for relatively short code words (e.g. of the order of 15 bits), the number of possible code words to be checked increases very rapidly with code word length. Thus, even for a 32-bit code word, in excess of 4,000,000,000 code words would potentially need to be listed, and this would be at best extremely time-consuming and in practice possibly prohibitive. The obstacle presented by this requirement is potentially increased by the absence of any guarantee that an appropriate subset of code words actually exists within the set being examined.

Popović, in the paper cited earlier, proposes the use of a single binary or polyphase complementary sequence. However, the 1996 paper mentioned above suggests that such sequences are not readily amenable in relation to their error correction/detection capability.

The patent application referenced above describes ways of identifying a set containing many different code words all of which satisfy desired criteria regarding error correction and detection properties, the maximum PMEPR of multi-carrier signals modulated in accordance with those code words, and ease and efficiency of implementation of a practical encoder and decoder (for example including use of combinatorial logic).

As described in that patent application, a set of code words is constructed by combining a 'base' code, derived from a 'generator matrix', with one or more 'coset representatives'. For example, in the case of 16bit (binary) code words the generator matrix is:

| | |
|---|---|
| (0000 0000 1111 1111) | ($X_1$) |
| (0000 1111 0000 1111) | ($X_2$) |
| (0011 0011 0011 0011) | ($X_3$) |
| (0101 0101 0101 0101) | ($X_4$) |
| (1111 1111 1111 1111) | (X') |

The 16-bit base code comprises all thirty-two linear combinations of rows of this generator matrix, that is combinations of the form $$a_1X_1 \oplus a_2X_2 \oplus a_3X_3 \oplus a_4X_4 \oplus a'X'$$

where row coefficients $a_1$, $a_2$, $a_3$, $a_4$ and a' each take values of 0 or 1. This base code is linear, i.e. the result of a bitwise exclusive-OR operation (modulo-2 addition) on any two of its code words is another code word in the code.

A corresponding generator array is created by combining the 16-bit generator matrix with additional rows (in this case six) derived by bitwise multiplication of all possible pairs of the rows $X_1$, $X_2$, $X_3$ and $X_4$:

| | |
|---|---|
| (0000 0000 0000 1111) | ($X_1 * X_2$) |
| (0000 0000 0011 0011) | ($X_1 * X_3$) |
| (0000 0000 0101 0101) | ($X_1 * X_4$) |
| (0000 0011 0000 0011) | ($X_2 * X_3$) |
| (0000 0101 0000 0101) | ($X_2 * X_4$) |
| (0001 0001 0001 0001) | ($X_3 * X_4$) |

Twelve particular coset representatives (for example, 0001 0010 0001 1101) constructed in a specific way from these additional rows are each combined by bitwise exclusive-OR operations with all code words in the 16-bit base code to produce the final desired set of code words, constituting a set of cosets of the base code.

Those code words constitute a set of cosets of a linear sub-code (which may be the whole code) having a generator matrix comprising the rows $X_1$, $X_2$, $X_3$, $X_4$ and X'. Using a base code of this kind provides desired error detection and correction properties. Selection of a linear subcode ensures that encoding and decoding within each coset can be implemented compactly, for example using combinatorial logic. A coset can in general be considered to be a systematic shift or translation of the base code to a different part of the overall space of possible code words. Use of cosets of the linear sub-code enables avoidance of certain undesired code words (such as all zeroes and all ones) which would result in particularly high values of PMEPR, but can also enable the error control properties of the base code to be retained to some extent. Choosing the code words from a set of such cosets allows good control of PMEPR because each coset of the base code tends to contain code words having broadly similar associated PMEPRs. In particular cases where the coset representatives have a form described in the patent application referenced above, it can be shown that the PMEPR does not exceed 3 dB; the minimum Hamming distance (i.e. the minimum number of symbols whose value must be altered, for example by interference, to transform a valid code word containing $2^m$ binary symbols into some other valid code word) is $2^{m-2}$.

In more general terms the generator matrix for a particular code word length $2^m$ is:

$$((2.0+1)\times 2^m)/2^m \quad ((2.1+1)\times 2^m)/2^m \quad \ldots$$
$$((2.0+1)\times 2^{m-1})/2^{m-1} \quad ((2.1+1)\times 2^{m-1})/2^{m-1} \quad \ldots$$
$$\ldots$$
$$((2.0+1)\times 2^y)/2^y \quad ((2.1+1)\times 2^y)/2^y \quad \ldots$$
$$\ldots$$
$$((2.0+1)\times 2^1)/2^1 \quad ((2.1+1)\times 2^1)/2^1 \quad \ldots$$
$$((2.0+1)\times 2^0)/2^0 \quad ((2.1+1)\times 2^0)/2^0 \quad \ldots$$

$$((2.z+1)\times 2^m)/2^m \quad \ldots \quad ((2.(2^m-1)+1)\times 2^m)/2^m$$
$$((2.z+1)\times 2^{m-1})/2^{m-1} \quad \ldots \quad ((2.(2^m-1)+1)\times 2^{m-1})/2^{m-1}$$

$$((2.z+1)\times 2^y)/2^y \quad \ldots \quad ((2.(2^m-1)+1)\times 2^y)2^y$$

$$((2.z+1)\times 2^1)/2^1 \quad \ldots \quad ((2.(2^m-1)+1)\times 2^1)/2^1$$
$$((2.z+1)\times 2^0)/2^0 \quad \ldots \quad ((2.(2^m-1)+1)\times 2^0)/2^0$$

where z has integer values from 0 to $2^m-1$, y has integer values from m to 0, and x indicates bitwise multiplication (bitwise logical AND) of two factors (such as (2.z+1) and $2^y$) both expressed as (m+1)-bit binary numbers, and the result of division is expressed as a single digit. The first line of this matrix (y=m) gives the row $X_1$, the second line (y=m−1) gives the row $X_2$, the penultimate line (y=1) gives the row $X_m$ and the final line (y=0) gives the row X'.

Thus, for example, for a code word length of sixty-four bits (m=6), the first symbol (z=0) on the second row $X_2$(y=m−1=5) is $$((2.0+1)\times 2^{m-1})/2^{m-1}$$

that is $$(1\times 32)/32$$

Expressing the factors involved in the bitwise multiplication as (m+1)-bit binary numbers results in $$(0000001\times 0100000)/32$$

which is (0000000)/32 or (expressed as a single digit) 0. The second symbol (z=1) on the second row is $((2.1+1)\times 2^{m-1})/2^{m-1}$ which is (3×32)/32, which yields (0000011×0100000)/32, or 0 again. The sixteenth symbol (z=15) on this row is $((2.15+1)\times 2^{m-1})/2^{m-1}$ which is (31×32)/32, which also yields (0011111×0100000)/32, or 0.

The seventeenth symbol (z=16) is $((2.16+1)\times 2^{m-1})/2^{m-1}$ which is (33×32)/32. This yields (0100001×0100000)/32, which is (0100000)/32 or 1. The same result is obtained for the eighteenth through to the thirty-second symbols.

For the thirty-third symbol (z=32) the matrix gives $((2.32+1)\times 2^{m-1})/2^{m-1}$ which is (65×32)/32 and this yields (1000001×0100000)/32, that is 0. A result of 0 is likewise obtained for the following fifteen symbols.

The forty-ninth symbol (z=48) is given by the expression $((2.48+1)\times 2^{m-1})/2^{m-1}$ which is (97×32)/32 giving (1100001×0100000)/32, or 1, which is the result for the final fifteen symbols as well. Thus the second row in its entirety is (0000 0000 0000 0000 1111 1111 1111 1111 0000 0000 0000 1111 1111 1111 1111)

For the third row $X_3$ (y=m−2=4) the first symbol is $((2.0+1)\times 2^{m-2})/2^{m-2}$ that is (1×16)/16 which is (0000001×0010000)/16, or 0; the same result is produced for the next seven symbols. For the ninth symbol the expression is $((2.8+1)\times 2^{m-2})/2^{m-2}$ that is (17×16)/16 and this yields (0010001×0010000)/16, or 1, and similarly for the tenth to sixteenth symbols. Thereafter the symbols continue in alternating blocks of eight zeroes and eight ones for the rest of the row:

(0000 0000 1111 1111 0000 0000 1111 1111 0000 0000 1111 1111 0000 0000 1111 1111)

The other rows of the generator matrix for 64-bit code words would be derived in similar manner.

The $2_m$-bit base code comprises all linear combinations of rows of the generator matrix, that is combinations of the form $$a_1X_1\oplus a_2X_2\oplus a_3X_3\oplus\ldots\oplus a_mX_m\oplus a'X'$$

where row coefficients $a_1, a_2, a_3, \ldots a_m$ and a' each take values of 0 or 1. The corresponding generator array is created by combining the $2^m$-bit generator matrix with additional rows derived by bitwise multiplication of all possible pairs of the rows $X_1, X_2, X_3, \ldots X_m$. Particular coset representatives derived from these additional rows in a specific way are each combined by bitwise exclusive-OR operations with all code words in the $2^m$-bit base code to produce the required code words, constituting a set of cosets of the base code.

This technique is also applicable to coding with any higher number q of symbol values which is an integer multiple of two, such as quaternary (q=4), hexary (q=6), octary (q=8) and higher orders. In such cases the same generator matrix is used as described above, e.g. for a code word containing 8 symbols ($2^m$=8 with m=3):

| | |
|---|---|
| (0000 1111) | ($X_1$) |
| (0011 0011) | ($X_2$) |
| (0101 0101) | ($X_3$) |
| (1111 1111) | (X') |

An 8-symbol quaternary base code (four possible symbol values) comprises all 256 linear combinations of the rows of this generator matrix, that is combinations of the form $$a_1X_1\oplus a_2X_2\oplus a_3X_3\oplus a'X'$$

where $\oplus$ now indicates symbol-wise addition modulo q (i.e. modulo 4 for quaternary) and row coefficients $a_1, a_2, a_3$ and a' each take all integer values from 0 to q−1 (i.e. 0 to 3 for quaternary). This base code is linear, i.e. the result of symbol-wise addition modulo 4 on any two of its code words is another code word in the code. The corresponding generator array is created by combining the generator matrix with additional rows. These additional rows are derived by symbol-wise multiplication modulo 4 of all possible pairs of the rows $X_1, X_2$ and $X_3$, that is $X_1*X_2, X_1*X_3$ and $X_2*X_3$. Thus for 8-symbol quaternary coding the additional rows are:

| | |
|---|---|
| (0000 0011) | ($X_2*X_2$) |
| (0000 0101) | ($X_1*X_3$) |
| (0101 0001) | ($X_2*X_3$) |

Likewise, a $2^m$-symbol quaternary base code comprises all linear combinations of rows of the generator matrix, that is combinations of the form $$a_1X_1 \oplus a_2X_2 \oplus a_3X_3 \oplus \ldots \oplus a_mX_m \oplus a'X'$$

where row coefficients $a_1, a_2, a_3, \ldots a_m$ and $a'$ each take values of 0, 1, 2 or 3. The corresponding generator array is created by combining the $2^m$-symbol generator matrix with additional rows derived by symbol-wise multiplication modulo 4 of all possible pairs of the rows $X_1, X_2, X_3, \ldots _{mH}$. Particular coset representatives derived from these additional rows in a specific way are each combined by symbol-wise addition modulo 4 with all code words in the $2^m$-symbol base code to produce the required code words.

Where the number of symbol values is q, the base code comprises all linear combinations of rows of the generator matrix, that is combinations of the form $$a_1X_1 \oplus a_2X_2 \oplus a_3X_3 \oplus \ldots \oplus a_mX_m \oplus a'X'$$

where row coefficients $a_1, a_2, a_3 \ldots a_m$ and $a'$ each take values of $0, 1, \ldots, q-1$ and $\oplus$ indicates symbol-wise addition modulo q. This base code is linear, i.e. the result of a symbol-wise addition modulo q on any two of its code words is another code word in the code. The corresponding generator array is created by combining the $2^m$-symbol generator matrix with additional rows derived by symbol-wise multiplication modulo q of all possible pairs of the rows $X_1, X_2, X_3, \ldots X_m$. Particular coset representatives derived from these additional rows in a specific way are each combined by symbol-wise addition modulo q with all code words in the $2^m$-symbol base code to produce the required code words.

In discussing the error detecting and error correcting properties of quaternary, octary and higher-order codes, the minimum Hamming distance alone does not fully describe the extent of possible errors affecting a code word. This is because an error in a single symbol can involve a transition through up to q/2 adjacent symbol values (where the values q−1 and 0 are considered to be adjacent). The practical effect may be as serious as, or more serious than, two or more errors in different symbols each involving only a single transition to an adjacent symbol value. For example, a change of a single octary symbol from value 6 to value 1 (a transition through 3 adjacent values) may be more serious than a change of two octary symbols, one from 6 to 7 and another from 7 to 0 (both being transitions to an adjacent value). Therefore an additional useful measure is the minimum Lee distance, defined as the minimum number of symbol value transitions required to transform a valid code word into some other valid code word. In the binary case the Hamming and Lee distances are identical.

The methods and apparatus for encoding and decoding COFDM signals as described in the above-referenced patent application provide a highly advantageous combination of error detection and correction properties, low PMEPR, convenience of implementation and useful rate of data transfer. As discussed in that patent application, in certain circumstances it may be desired to modify the selection of code words to alter the tradeoffs between these different properties.

For example, it may be desired to increase the available population of code words, in order to increase the data transfer rate, at the expense of accepting a higher maximum value of PMEPR. For example, it is possible to construct additional cosets of the base code and to derive the maximum peak envelope power (PEP) resulting from use of code words within that coset. This enables the cosets to be listed in ascending order of maximum PEP over each coset, so that cosets can be selected to provide some desired number of code words without yielding a PMEPR in excess of some desired threshold. However, identifying possible trade-offs between data transfer rate and PMEPR by constructing a list of coset representatives ordered by maximum PEP over each coset, as described in the above-referenced patent application, has the disadvantage, especially for longer code words and/or higher-order codes, of requiring extensive calculation.

The present invention identifies a set of coset representatives which can be combined with the base code to produce code words associated with a PMEPR no greater than a known value, without calculating the maximum PEP over each coset (although this technique does not provide any ordering by PMEPR for the cosets in the set). Although for convenience the invention will be described below with reference to binary, quaternary and octary codes (q=2, 4 and 8 respectively), the invention can be applied to any code where the number q of possible symbols is an even integer.

The technique will be illustrated first in the case of a binary code of length 16 (m=4), that is with a generator array

| | |
|---|---|
| (0000 0000 1111 1111) | $(X_1)$ |
| (0000 1111 0000 1111) | $(X_2)$ |
| (0011 0011 0011 0011) | $(X_3)$ |
| (0101 0101 0101 0101) | $(X_4)$ |
| (1111 1111 1111 1111) | $(X')$ |
| (0000 0000 0000 1111) | $(X_1{}^*X_2)$ |
| (0000 0000 0011 0011) | $(X_1{}^*X_3)$ |
| (0000 0000 0101 0101) | $(X_1{}^*X_4)$ |
| (0000 0011 0000 0011) | $(X_2{}^*X_3)$ |
| (0000 0101 0000 0101) | $(X_2{}^*X_4)$ |
| (0001 0001 0001 0001) | $(X_3{}^*X_4)$ |

As a first step towards producing the set of coset representatives, an initial set of eight ($2^{m-1}$) expressions is constructed, each having the form $$(X_1{}^*X_2) \oplus (X_2{}^*X_3) \oplus v_1(X_1{}^*X_4) \oplus v_2(X_2{}^*X_4) \oplus v_3(X_3{}^*X_4)$$

where $v_1$, $v_2$ and $v_3$ are coefficients having values of 0 or 1 and $\oplus$ indicates bitwise addition modulo 2. Thus the initial set is

| | |
|---|---|
| $(X_1{}^*X_2) \oplus (X_2{}^*X_3)$ | $(v_1 = 0, v_2 = 0, v_3 = 0)$ |
| $(X_1{}^*X_2) \oplus (X_2{}^*X_3) \oplus (X_1{}^*X_4)$ | $(v_1 = 1, v_2 = 0, v_3 = 0)$ |
| $(X_1{}^*X_2) \oplus (X_2{}^*X_3) \oplus (X_2{}^*X_4)$ | $(v_1 = 0, v_2 = 1, v_3 = 0)$ |
| $(X_1{}^*X_2) \oplus (X_2{}^*X_3) \oplus (X_1{}^*X_4) \oplus (X_2{}^*X_4)$ | $(v_1 = 1, v_2 = 1, v_3 = 0)$ |
| $(X_1{}^*X_2) \oplus (X_2{}^*X_3) \oplus (X_3{}^*X_4)$ | $(v_1 = 0, v_2 = 0, v_3 = 1)$ |
| $(X_1{}^*X_2) \oplus (X_2{}^*X_3) \oplus (X_1{}^*X_4) \oplus (X_3{}^*X_4)$ | $(v_1 = 1, v_2 = 0, v_3 = 1)$ |
| $(X_1{}^*X_2) \oplus (X_2{}^*X_3) \oplus (X_2{}^*X_4) \oplus (X_3{}^*X_4)$ | $(v_1 = 0, v_2 = 1, v_3 = 1)$ |
| $(X_1{}^*X_2) \oplus (X_2{}^*X_3) \oplus (X_1{}^*X_4) \oplus (X_2{}^*X_4) \oplus (X_3{}^*X_4)$ | $(v_1 = 1, v_2 = 1, v_3 = 1)$ |

This initial set is then extended by applying all possible permutations of the subscripts of the row identifiers $X_1$, $X_2$, $X_3$ and $X_4$ in each expression. Thus, for example, applying the permutation $\pi$ defined by $\pi(1)=2, \pi(2)=3, \pi(3)=4, \pi(4)=1$ to the subscripts of the row identifiers in the expression $(X_1{}^*X_2) \oplus (X_2{}^*X_3)$ results in the expression $(X_2{}^*X_3) \oplus (X_3{}^*X_4)$.

A final set is produced by identifying the distinct expressions within the extended set; for this purpose, terms with the same pair of subscripts but in reverse order (such as $X_1{}^*X_2$ and $X_2{}^*X_1$) are regarded as being the same, and the ordering of such terms within an expression is disregarded. For example, applying the permutation $\pi'$ defined by $\pi'(1)=4$, $\pi'(2)=3$, $\pi'(3)=2$, $\pi'(4)=1$ to the same expression $(X_1*X_2) \oplus (X_2*X_3)$ results in the expression $(X_4*X_3) \oplus (X_3*X_2)$, which is not regarded as being distinct from $(X_2*X_3) \oplus ((X_3*X_4))$.

The final set of expressions, forty-nine in all, defining the required set of coset representatives, is given in Table 1, in terms of six coefficients which constitute multipliers for the respective additional rows of the code's generator array which are added modulo 2 to create the corresponding coset representative; thus, for example, a 1 under the heading '12' indicates that the additional row $(X_1*X_2)$ is multiplied by 1 for inclusion in the coset representative, whereas a 0 indicates it is multiplied by 0 (i.e. effectively omitted).

TABLE 1

| 12 | 13 | 14 | 23 | 24 | 34 |
|----|----|----|----|----|----|
| 1 | 0 | 0 | 1 | 0 | 0 |
| 1 | 0 | 0 | 0 | 1 | 0 |
| 0 | 1 | 0 | 1 | 0 | 0 |
| 0 | 0 | 1 | 0 | 1 | 0 |
| 0 | 1 | 0 | 0 | 0 | 1 |
| 0 | 0 | 1 | 0 | 0 | 1 |
| 1 | 1 | 0 | 0 | 0 | 0 |
| 1 | 0 | 1 | 0 | 0 | 0 |
| 0 | 1 | 1 | 0 | 0 | 0 |
| 0 | 0 | 0 | 1 | 0 | 1 |
| 0 | 0 | 0 | 0 | 1 | 1 |
| 1 | 0 | 1 | 1 | 0 | 0 |
| 1 | 1 | 0 | 0 | 1 | 0 |
| 0 | 1 | 1 | 1 | 0 | 0 |
| 1 | 1 | 0 | 0 | 0 | 1 |
| 1 | 0 | 1 | 0 | 0 | 1 |
| 0 | 1 | 0 | 1 | 1 | 0 |
| 0 | 0 | 1 | 1 | 1 | 0 |
| 1 | 0 | 0 | 1 | 0 | 1 |
| 1 | 0 | 0 | 0 | 1 | 1 |
| 0 | 0 | 1 | 1 | 0 | 1 |
| 0 | 1 | 0 | 0 | 1 | 1 |
| 1 | 0 | 0 | 1 | 1 | 0 |
| 0 | 1 | 0 | 1 | 0 | 1 |
| 0 | 0 | 1 | 0 | 1 | 1 |
| 1 | 1 | 1 | 0 | 0 | 0 |
| 1 | 0 | 1 | 1 | 1 | 0 |
| 1 | 1 | 0 | 1 | 1 | 0 |
| 0 | 1 | 1 | 1 | 0 | 1 |
| 1 | 1 | 0 | 1 | 0 | 1 |
| 1 | 0 | 1 | 0 | 1 | 1 |
| 1 | 1 | 1 | 0 | 1 | 0 |
| 1 | 1 | 1 | 1 | 0 | 0 |
| 1 | 1 | 1 | 0 | 0 | 1 |
| 0 | 1 | 0 | 1 | 1 | 1 |
| 0 | 0 | 1 | 1 | 1 | 1 |
| 1 | 0 | 0 | 1 | 1 | 1 |
| 1 | 0 | 1 | 1 | 0 | 1 |
| 1 | 1 | 0 | 0 | 1 | 1 |
| 0 | 1 | 1 | 1 | 1 | 0 |
| 1 | 0 | 1 | 1 | 1 | 1 |
| 1 | 1 | 0 | 1 | 1 | 1 |
| 0 | 1 | 1 | 1 | 1 | 1 |
| 1 | 1 | 1 | 0 | 1 | 1 |
| 1 | 1 | 1 | 1 | 0 | 1 |
| 1 | 1 | 1 | 1 | 1 | 0 |

A code whose code words are obtained by combining any of these coset representatives with the base code has the following properties:

- the code's minimum Hamming distance is 4 ($2^{m-2}$);
- a multi-carrier signal modulated in accordance with these code words has a PMEPR of no more than 6 dB;
- a decoder based on Hamming distance for use with such a code can operate using analytical techniques and can be implemented, for example, using combinatorial logic at least in part;
- there are sufficient code words available to enable an acceptable data transfer rate to be attained.

Figure 8:
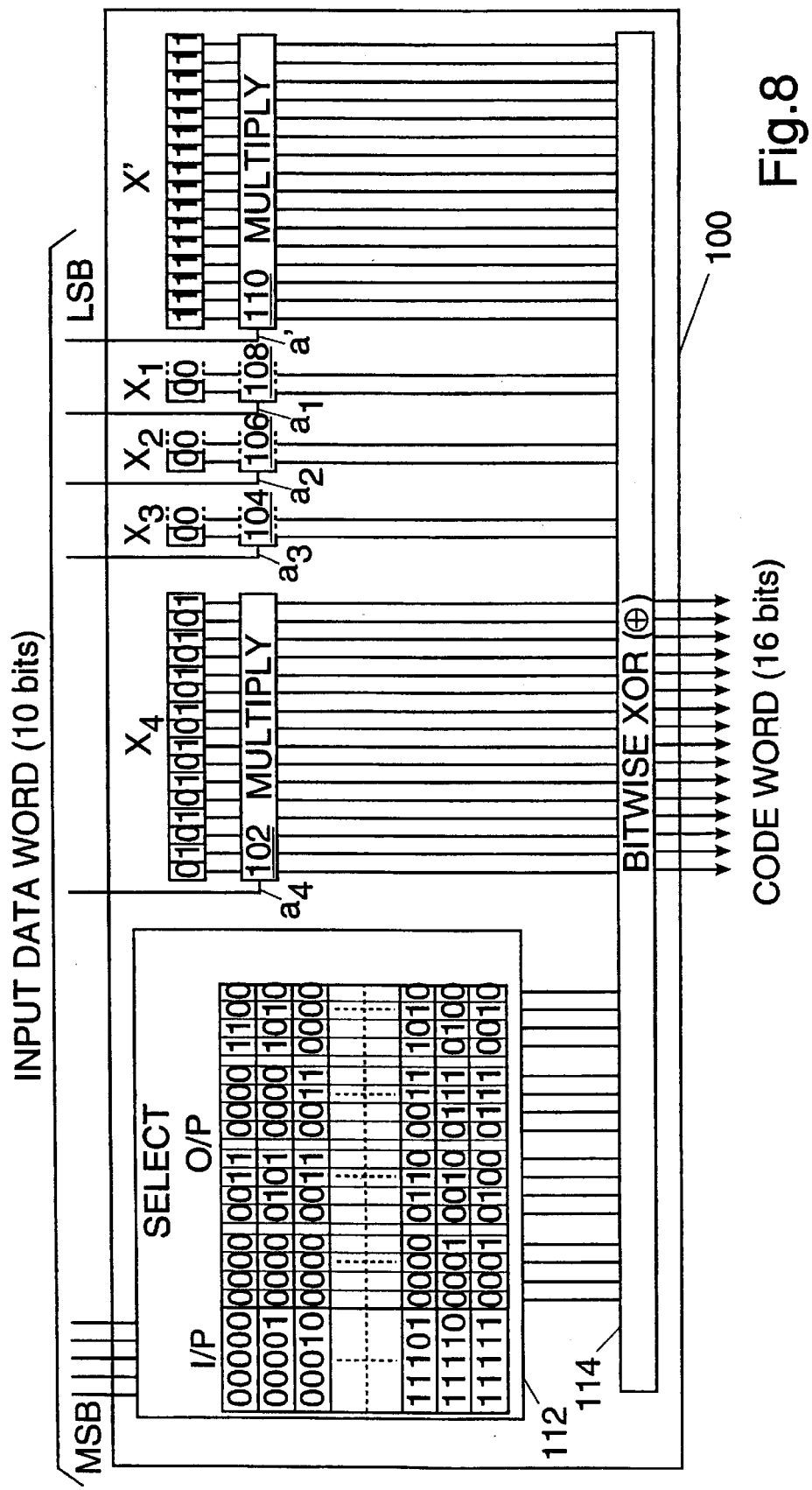
FIG. 8 shows an encoder for encoding 10-bit data words as 16-bit code words.

FIG. 8 shows a 10B/16B encoder 100 for encoding 10-bit data words as 16-bit code words selected in accordance with this invention. This encoder includes five binary multipliers 102 to 110 for multiplying the five least significant bits of the input data word (treated as row coefficients $a_1$, $a_2$, $a_3$, $a_4$ and $a'$) by respective ones of the 16-bit generator matrix rows $X_4$, $X_3$, $X_2$, $X_1$ and $X'$. The five most significant bits of the input data word are supplied to a selector 112 which selects one of thirty-two possible coset representative values in accordance with the combined value of those five bits. In the example shown in FIG. 8 the first thirty-two of the forty-nine possible coset representatives listed in Table 1 have been chosen (arbitrarily) for use in the selector 112. Thus, for example, the first coset representative comprises the modulo-2 addition of the additional rows $(X_1*X_2)$ and $(X_2*X_3)$, that is (0000 0000 0000 1111)$\oplus$(0000 0011 0000 0011)=(0000 0011 0000 1100), and is arbitrarily assigned to the 5-bit selector input value 00000; the last coset representative in the selector 112, arbitrarily assigned to the input value 11111, comprises the modulo-2 addition of the additional rows $(X_1*X_3)$, $(X_1*X_4)$, $(X_2*X_4)$ and $(X_3*X_4)$, that is (0000 0000 0011 0011)$\oplus$(0000 0000 0101 0101)$\oplus$(0000 0101 0000 0101)$\oplus$(0001 0001 0001 0001)=(0001 0100 0111 0010).

The outputs of the five binary multipliers 102 to 110 and of the selector 112 are combined by a bitwise exclusive-OR circuit 114 to produce the 16-bit code word.

This code word can be decoded after reception in various ways. For example, it can be treated as a code word in the second order Reed-Muller code of length 16, RM(2,4), and decoded using known techniques for such a code word. As an alternative the "Supercode" decoding method described in 'Soft decoding techniques for codes and lattices, including the Golay code and the Leech lattice' by J. H. Conway and N. J. A. Sloane, *IEEE Trans. Inform. Theory*, 1986, vol. IT-32, no. 1, pp. 41–50, may be used. Other decoders are described in the above-referenced patent application.

In the general case of a binary code of length $2^m$ bits where $m \geq 3$, the initial set of $2^{m-1}$ expressions is constructed with the form $$(X_1*X_2) \oplus (X_2*X_3) \oplus \ldots \oplus (X_{m-2}*X_{m-1}) \oplus v_1(X_1*X_m) \oplus v_2(X_2*X_m) \oplus \ldots \oplus v_{m-1}(X_{m-1}*X_m)$$

where $v_1, v_2, \ldots v_{m-1}$ are coefficients having values of 0 or 1, and the permutation of subscripts and identification of distinct expressions is performed as described above, to define a set of coset representatives which may be used in encoding (e.g. by incorporating some or all of them in the selector of an encoder similar to that shown in FIG. 8). The number of cosets and the total number of code words identified by this procedure for various code word lengths (in terms of the parameter m) are given below:

| m | Cosets | No. of code words |
|---|--------|-------------------|
| 3 | 7 | 112 |
| 4 | 49 | 1568 |
| 5 | 552 | 35328 |
| 6 | 7800 | 998400 |
| 7 | 126360 | 32348160 |

A modification of this technique, applicable for word lengths of 32 or more bits ($m \geq 5$), enables a large subset of these cosets to be identified, without the need for examining the extended set of expressions to find and discard expressions which are not distinct. In other words, this modified technique can be guaranteed to produce an extended set of expressions which are inherently distinct. To this end:

the combinations of values of the coefficients $v_1, v_2, \ldots v_{m-1}$ are limited to combinations such that the binary words of the form $v_1v_2v_3\ldots v_{m-2}v_{m-1}$ have Hamming weight of at least 4; and the permutations of subscripts of the terms $X_1$ to $X_m$ satisfy the condition that the subscript 1 is permuted to a value less than the value to which the subscript m−1 is permuted (i.e. $\pi(1)<\pi(m-1)$).

Constructing an initial set of expressions with the form given above but with this limited set of combinations of coefficients, and applying this limited set of permutations of the subscripts of the row identifiers in each expression, directly yields a final set of distinct expressions defining the required subset of coset representatives. The code words produced by combining the base code with any coset representative in this subset result in a PMEPR of at most 6 dB. Exactly $$\frac{m!}{2}\left[2^{m-1}-\binom{m-1}{3}-\binom{m-1}{2}-m\right]$$

coset representatives are identified by this procedure; in particular, at least $m!.2^{m-3}$ coset representatives are identified by this procedure when $m\geq 8$.

An alternative modification, applicable for word lengths of 64 or more bits ($m\geq 26$), enables a smaller subset of cosets to be identified, again without the need for examining the extended set of expressions to find and discard expressions which are not distinct, and also without any restriction on the permutations $\pi$. To this end, the combinations of values of the coefficients $v_1v_2, \ldots v_{m-1}$ are limited to combinations such that the binary words of the form $v_1v_2v_3\ldots v_{m-2}v_{m-1}$ have the following two properties:

each word $v_1v_2v_3\ldots v_{m-2}v_{m-1}$ has Hamming weight of at least 4; and $$\sum_{i=0}^{\lfloor(m-3)/2\rfloor} v_{i+1}2^i < \sum_{i=0}^{\lfloor(m-3)/2\rfloor} v_{m-1-i}2^i$$

Constructing an initial set of expressions with the form given above but with this limited set of combinations of coefficients, and applying all possible permutations of the subscripts of the row identifiers in each expression, directly yields a final set of distinct expressions defining the required subset of coset representatives. The code words produced by combining the base code with any coset representative in this subset result in a PMEPR of at most 6 dB. At least $m!.2^{m-4}$ coset representatives are identified by this procedure when $m\geq 7$.

Similar techniques can be used for identifying cosets of quaternary and higher-order code words which result in a known maximum PMEPR. For a quaternary code of length $2^m$ where $m\geq 3$, an initial set of $2^{m-1}$ expressions is constructed of the form $$2(X_1{}^*X_2)\oplus 2(X_2{}^*X_3)\oplus\ldots\oplus 2(X_{m-2}{}^*X_{m-1})\oplus 2v_1(X_1{}^*X_m)\oplus 2v_2(X_2{}^*X_m)\oplus\ldots\oplus 2v_{m-1}(X_{m-1}{}^*X_m)$$

where $v_1, v_2, \ldots v_{m-1}$ are coefficients having values of 0 or 1 and $\oplus$ indicates symbol-wise addition modulo 4. This initial set is then extended by applying all possible permutations of the subscripts of the row identifiers $X_1, X_2, X_3, \ldots X_m$ in each expression. A final set of expressions, defining the required set of coset representatives, is produced by identifying the distinct expressions within the extended set, as previously described for the binary case. Members of this set of coset representatives may be used in a selector of an encoder like that shown in FIG. 8, but modified for operation with quaternary values. Thus, the coset representatives comprise symbols having possible values of 0 or 2; each generator matrix row $X_1, X_2, X_3, \ldots X_m$ and $X'$ is multiplied by a quaternary value (representing, for example, the value of a respective pair of bits of an input binary word); and the products supplied by the multipliers are combined with the selected coset representative by symbol-wise modulo-4 addition.

A quaternary code whose code words are obtained by combining any of these coset representatives with the quaternary base code has the following properties:

the code's minimum Hamming distance is $2^{m-2}$ and its minimum Lee distance is $2^{m-1}$;

a multi-carrier signal modulated in accordance with these code words has a PMEPR of no more than 6 dB;

a decoder for use with such a code can operate using analytical techniques and can be implemented, for example, using combinatorial logic at least in part;

there are sufficientcode words available to enable an acceptable data transfer rate to be attained.

The number of cosets and the total number of quaternary code words identified by this procedure for various code word lengths (in terms of the parameter m) are given below:

| m | Cosets | No. of code words |
|---|--------|-------------------|
| 3 | 7      | 1792              |
| 4 | 49     | 50176             |
| 5 | 552    | 2Z60992           |
| 6 | 7800   | 127795200         |
| 7 | 126360 | 8281128960        |

As in the binary case, for word lengths of 32 or more symbols ($m\geq 5$) a large subset of these cosets can be identified, without the need for examining the extended set of expressions to find and discard expressions which are not distinct. This is accomplished by limiting the combinations of values of the coefficients $v_1, v_2, \ldots v_{m-1}$ and the permutations of subscripts in the same way as described above for the binary case. Exactly $$\frac{m!}{2}\left[2^{m-1}-\binom{m-1}{3}-\binom{m-1}{2}-m\right]$$

coset representatives are identified by this procedure; in particular, at least $m!.2^{m-3}$ coset representatives are identified by this procedure when $m\geq 8$. The code words produced by combining the quaternary base code with any coset representative in this subset yield a PMEPR of at most 6 dB.

For word lengths of 64 or more symbols ($m\geq 6$) a smaller subset of cosets can be identified, again without the need for examining the extended set of expressions to find and discard expressions which are not distinct, and also without any restriction on the permutations $\pi$. This is accomplished by limiting the combinations of values of the coefficients $v_1, v_2, \ldots v_{m-1}$ to combinations such that the binary words of the form $v_1v_2v_3\ldots v_{m-2}v_{m-1}$ have the two properties specified in the discussion above for the alternative modification in the binary case. For $m \geq 7$ at least $m!.2^{m-4}$ distinct coset representatives are identified by this procedure, and the code words produced by combining the quaternary base code with any coset representative in this subset yield a PMEPR of at most 6 dB.

For quaternary code words of length $2^m$ where $m \geq 3$, a further modification is possible, by allowing the coefficients $v_1, v_2, \ldots v_{m-1}$ to have any of the four values 0, 1, 2 or 3 and modifying the form of the expressions in the initial set to be $$2(X_1{}^*X_2) \oplus 2(X_2{}^*X_3) \oplus \ldots \oplus 2(X_{m-2}{}^*X_{m-1}) \oplus v_1(X_1{}^*X_m) \oplus v_2(X_2{}^*X_m) \oplus \ldots \oplus v_{m-1}(X_{m-1}{}^*X_m)$$

(i.e. without a multiplier of 2 before each coefficient). This initial set is then extended by applying all possible permutations of the subscripts of the row identifiers $X_1, X_2, X_3, \ldots X_m$ in each expression. A final set of expressions, defining the required set of coset representatives, is produced by identifying the distinct expressions within the extended set, as previously described for the binary case. The number of cosets and the total number of quaternary code words obtained with this modification for various code word lengths (in terms of the parameter m) are given below:

| m | Cosets | No. of code words |
|---|---|---|
| 3 | 37 | 9472 |
| 4 | 661 | 676864 |
| 5 | 14472 | 59277312 |
| 6 | 360600 | 5908070400 |
| 7 | $\geq 1290240$ | $\geq 84557168640$ |

It can be seen that many more cosets are available in this case, so there is a potential for a higher data transfer rate. The code words produced by combining the quaternary base code with any coset representative identified by this modified procedure yield a PMEPR of at most 6 dB; however, the minimum Lee distance with this modification is reduced to $2^{m-2}$.

An additional modification produces an extended set of expressions which are guaranteed to be distinct after permuting the subscripts of the row identifiers, by:

restricting the values of the coefficients $v_1, v_2, \ldots v_{m-1}$ such that at least two of them have values other than 0 and 2; and restricting the permutations of subscripts of the terms $X_1$ to $X_m$ to satisfy the condition that the subscript 1 is permuted to a value less than the value to which the subscript $m-1$ is permuted (i.e. $\pi(1) < \pi(m-1)$).

For $m \geq 3$, at least $m!.2^{2m-5}$ distinct coset representatives are obtained with this approach.

An alternative modification produces a smaller extended set of expressions which are guaranteed to be distinct after permuting the subscripts of the row identifiers without any restriction on the permutations $\pi$, by fixing the values of the coefficients $v_1$ and $v_{m-1}$ to be 1 and 3 respectively while allowing the other coefficients to have any value from 0 to 3. For $m \geq 3$, at least $m!.2^{2m-6}$ distinct coset representatives are obtained with this approach.

For an octary code of length $2^m$ where $m \geq 3$, an initial set of $4^{m-1}$ expressions is constructed of the form $$4(X_1{}^*X_2) \oplus (X_2{}^*X_3) \oplus \ldots \oplus 4(X_{m-2}{}^*X_{m-1}) \oplus 2v_1(X_1{}^*X_m) \oplus 2v_2(X_2{}^*X_m) \oplus \ldots \oplus 2v_{m-1}(X_{m-1}{}^*X_m)$$

where $v_1, v_2, \ldots v_{m-1}$ are coefficients having values of 0, 1, 2 or 3 and $\oplus$ indicates symbol-wise addition modulo 8. This initial set is then extended by applying all possible permutations of the subscripts of the row identifiers $X_1, X_2, X_3, \ldots X_m$ in each expression. A final set of expressions, defining the required set of coset representatives, is produced by identifying the distinct expressions within the extended set, as previously described for the binary case. Members of this set of coset representatives may be used in a selector of an encoder like that shown in FIG. 8, but modified for operation with octary values. Thus, the coset representatives comprise symbols having possible values of 0, 2, 4 or 6; each generator matrix row $X_1, X_2, X_3, \ldots X_m$ and X' is multiplied by an octary value (representing, for example, the value of a respective triplet of bits of an input binary word); and the products supplied by the multipliers are combined with the selected coset representative by symbol-wise modulo-8 addition.

Octary code words obtained by combining any of these coset representatives with the base code have the following properties:

the code's minimum Hamming distance is 22 and its minimum Lee distance is $2^{m-1}$;

a multi-carrier signal modulated in accordance with these code words has a PMEPR of no more than 6 dB;

a decoder for use with such a code can operate using analytical techniques and can be implemented, for example, using combinatorial logic at least in part;

there are sufficient code words available to enable an acceptable data transfer rate to be attained; in general, this procedure identifies at least $m!.2^{2m-5}$ distinct coset representatives when $m \geq 3$.

The number of cosets and the total number of octary code words for various code word lengths (in terms of the parameter m) are given below:

| m | Cosets | No. of code words |
|---|---|---|
| 3 | 37 | 151552 |
| 4 | 661 | 21659648 |
| 5 | 14472 | 3793747968 |
| 6 | 360600 | 756233011200 |
| 7 | $\geq 1290240$ | $> 2.16 \times 10^{13}$ |

A modification produces an extended set of expressions which are guaranteed to be distinct after permuting the subscripts of the row identifiers, by:

restricting the values of the coefficients $v_1, v_2, \ldots v_{m-1}$ such that at least two of them have values other than 0 and 2; and restricting the permutations of subscripts of the terms $X_1$ to $X_m$ to satisfy the condition that the subscript 1 is permuted to a value less than the value to which the subscript $m-1$ is permuted (i.e. $\pi(1) < \pi(m-1)$).

For $m \geq 3$, at least $m!.2^{2m-5}$ distinct coset representatives are obtained with this approach.

An alternative modification produces a smaller extended set of expressions which are guaranteed to be distinct after permuting the subscripts of the row identifiers without any restriction on the permutations $\pi$, by fixing the values of the coefficients $v_1$ and $v_{m-1}$ to be 1 and 3 respectively while allowing the other coefficients to have any value from 0 to 3. For $m \geq 3$, at least $m!.2^{2m-6}$ distinct coset representatives are obtained with this approach.

For octary code words of length $2^m$ where $m \geq 3$, another modification is possible, by allowing the coefficients $v_1, v_2, \ldots v_{m-1}$ to have any of the eight values 0 to 7 and modifying the form of the expressions in the initial set to be $$4(X_1{}^*X_2) \oplus 4(X_2{}^*X_3) \oplus \ldots \oplus 4(X_{m-2}{}^*X_{m-1}) \oplus v_1(X_1{}^*X_m) \oplus v_2(X_2{}^*X_m) \oplus \ldots \oplus v_{m-1}(X_{m-1}{}^*X_m)$$

(i.e. without a multiplier of 2 before each coefficient). This initial set is then extended by applying all possible permutations of the subscripts of the row identifiers $X_1$, $X_2$, $X_3$, ... $X_m$ in each expression. A final set of expressions, defining the required set of coset representatives, is produced by identifying the distinct expressions within the extended set, as previously described for the binary case. The number of cosets and the total number of octary code words obtained with this modification for various code word lengths (in terms of the parameter m) are given below:

| m | Cosets | No. of code words |
|---|---|---|
| 3 | 169 | 692224 |
| 4 | 5917 | 193888256 |
| 5 | 243912 | 63940067328 |
| 6 | >5.52 × 10⁶ | >1.15 × 10¹³ |
| 7 | >3.09 × 10⁸ | >5.19 × 10¹⁵ |

It can be seen that many more cosets are available in this case, so there is a potential for a higher data transfer rate. The code words produced by combining the octary base code with any coset representative identified by this modified procedure yield a PMEPR of at most 6 dB; however, the minimum Lee distance with this modification is reduced to $2^{m-2}$.

An additional modification produces an extended set of expressions which are guaranteed to be distinct after permuting the subscripts of the row identifiers, by:

restricting the values of the coefficients $v_1, v_2, \ldots v_{m-1}$ such that at least two of them have values other than 0 and 4; and restricting the permutations of subscripts of the terms $X_1$ to $X_m$ to satisfy the condition that the subscript 1 is permuted to a value less than the value to which the subscript m−1 is permuted (i.e. $\pi(1) < \pi(m-1)$).

For $m \geq 3$, at least $18.m!.8^{m-1}$ distinct coset representatives are obtained with this approach.

An alternative modification produces an extended set of expressions which are guaranteed to be distinct after permuting the subscripts of the row identifiers, without any restriction on the permutations $\pi$, by choosing the values of the coefficients $v_1$ and $v_{m-1}$ to be any one of the following ordered pairs of values, where the value of $v_1$ is given first: 1,2; 1,3; 1,5; 1,6; 1,7; 2,3; 2,5; 2,6; 2,7; 3,5; 3,6; 3,7; 5,6; 5,7; 6,7. The other coefficients may have any value from 0 to 7. For $m \geq 3$, at least $15.m!.8^{m-3}$ distinct coset representatives are obtained with this approach.

These techniques for identifying cosets defining code words producing a PMEPR of no more than 6 dB can be extended to higher-order codes where q is an even integer. If the expressions in the initial set have the form $$(q/2)(X_1{}^*X_2) \oplus (q/2)(X_2{}^*X_3) \oplus \ldots \oplus (q/2)(X_{m-2}{}^*X_{m-1}) \oplus v_1(X_1{}^*X_m) \oplus v_2(X_2{}^*X_m) \oplus \ldots \oplus v_{m-1}(X_{m-1}{}^*X_m)$$

where $v_1, v_2, \ldots v_{m-1}$ are coefficients having values of 0 to q−1 and $\oplus$ indicates symbol-wise addition modulo q, the code's minimum Lee distance is $2^{m-2}$, and any even value of q is usable. If the expressions have the form $$(q/2)(X_1{}^*X_2) \oplus (q/2)(X_2{}^*X_3) \oplus \ldots \oplus (q/2)(X_{m-2}{}^*X_{m-1}) \oplus 2v_1(X_1{}^*X_m) \oplus 2v_2(X_2{}^*X_m) \oplus \ldots \oplus 2v_{m-1}(X_{m-1}{}^*X_m)$$

where $v_1, v_2, \ldots v_{m-1}$ are coefficients having values of 0 to $(q/2)-1$, the code's minimum Lee distance is increased to $2^{m-1}$, but only values of q divisible by four are usable.

More generally, large sets of coset representatives can be identified for codes containing $2^m$ symbols where $m \geq 3$, each symbol having q possible values, for which the PMEPR is guaranteed to be at most $2^{p+1}$, for any fixed integer p where $1 \leq p \leq m-2$. To this end, p sets of coefficients are defined as follows $$(v_{1,1}, v_{1,2}, \ldots v_{1,m-p})$$
$$(v_{2,1}, v_{2,2}, \ldots v_{2,m-p})$$
$$\ldots$$
$$(v_{p,1}, v_{p,2}, \ldots v_{p,m-p})$$

where each coefficient can have an integer value from 0 to q−1. A further $p(p-1)/2$ coefficients $W_{i,j}$, where $1 \leq i < j \leq p$, are defined where each $W_{i,j}$ can have an integer value from 0 to q−1. For an initial choice of the coefficients $v_{i,j}$ and $w_{i,j}$ an expression is constructed of the form $$(q/2)(X_1 * X_2) \oplus (q/2)(X_2 * X_3) \oplus \ldots \oplus (q/2)(X_{m-p-1} * X_{m-p}) \oplus$$
$$v_{1,1}(X_1 * X_{m-p+1}) \oplus v_{1,2}(X_2 * X_{m-p+1}) \oplus \ldots \oplus v_{1,m-p}(X_{m-p} * X_{m-p+1}) \oplus$$
$$v_{2,1}(X_1 * X_{m-p+2}) \oplus v_{2,2}(X_2 * X_{m-p+2}) \oplus \ldots \oplus v_{2,m-p}(X_{m-p} * X_{m-p+2}) \oplus$$
$$\ldots$$
$$v_{p,1}(X_1 * X_m) \oplus v_{p,2}(X_2 * X_m) \oplus \ldots \oplus v_{p,m-p}(X_{m-p} * X_m) \oplus$$
$$w_{1,2}(X_{m-p+1} * X_{m-p+2}) \oplus$$
$$w_{1,3}(X_{m-p+1} * X_{m-p+3}) \oplus w_{2,3}(X_{m-p+2} * X_{m-p+3}) \oplus$$
$$w_{1,4}(X_{m-p+1} * X_{m-p+4}) \oplus w_{2,4}(X_{m-p+2} * X_{m-p+4}) \oplus$$
$$w_{3,4}(X_{m-p+3} * X_{m-p+4}) \oplus$$
$$\ldots$$
$$w_{1,p}(X_{m-p+1} * X_m) \oplus w_{2,p}(X_{m-p+2} * X_m) \oplus \ldots \oplus w_{p-1,p}(X_{m-1} * X_m)$$

where $\oplus$ indicates symbol-wise addition modulo q; further expressions of this form are constructed for the remaining possible combinations of choices of the coefficients $v_{i,j}$ and $w_{i,j}$ to obtain an initial set of $q^{p(m-p)+p(p-1)/2}$ expressions. This initial set is then extended by applying all possible permutations of the subscripts of the row identifiers $X_1$, $X_2$, $X_3$, ... $X_m$ in each expression. A final set of expressions, defining the required set of coset representatives, is produced by identifying the distinct expressions within the extended set, as previously described for the binary case. The set of code words produced by combining the base code of order q with any coset representative identified by this procedure have a minimum Lee distance and a minimum Hamming distance both of $2^{m-2}$. In the case where $q \geq 4$ and q is divisible by 4, a further modification is possible in which the coefficients $v_{i,j}$ and $w_{i,j}$ are restricted to have even values in the ranges specified above. In this case fewer cosets will be identified, but the resulting code will have a minimum Lee distance of $2^{m-1}$.

Another modification, for $p \leq m-4$, produces an extended set of expressions which are guaranteed to be distinct after permuting the subscripts of the row identifiers, by:

restricting the values of the coefficients $v_{i,j}$ such that $$\sum_{j=1}^{m-p} v_{1,j}q^{j-1} < \sum_{j=1}^{m-p} v_{2,j}q^{j-1} < \ldots < \sum_{j=1}^{m-p} v_{p,j}q^{j-1}$$

and such that each word $v_{i,1}v_{i,2}\ldots v_{i,m-p-1}v_{i,m-p}$ has Hamming weight of at least 4;

restricting the coefficients $w_{i,j}$ for $1 \leq i < j \leq p$ to have values $q/2$;

restricting the permutations of subscripts of the terms $X_1$ to $X_m$ to satisfy the condition that the subscript 1 is permuted to a value less than the value to which the subscript m–p is permuted (i.e. $\pi(1) < \pi(m-p)$).

If $q \geq 4$ and q is divisible by 4, the coefficients $v_{i,j}$ and $w_{i,j}$ may additionally be restricted to have even values in the ranges specified above. In this case fewer cosets will be identified, but the resulting code will have a minimum Lee distance of $2^{m-1}$.

The discussions above of quaternary codes have been expressed in terms of quaternary symbols having possible values of 0, 1, 2 and 3. For actual transmission, for example by quadrature phase-shift keying (QPSK) modulation, these values would correspond to four different values of phase shift. One possibility is phase shifts of 0°, 90°, 180° and 270° (equivalent to complex vectors 1, i, –1 and –i respectively, where $i = \sqrt{-1}$). However, other variants are possible in which the phase shifts are, for example, 45°, 135°, 225° and 315° (equivalent to complex vectors $(1+i)/\sqrt{2}$, $(-1+i)/\sqrt{2}$, $(-1-i)/\sqrt{2}$ and $(1-i)/\sqrt{2}$ respectively). This principle applies for codes with more symbol values (q>4, any even integer), and indeed in other applications the symbol values may be represented by any q distinguishable signal modulations; their amplitudes need not be equal, and, in the case of phase-shift keying, the phase differences between adjacent pairs need not all be equal.

The code words in the codes defined above also have useful properties for establishing synchronization of timing of circuit operation with a received signal. Accordingly, the circuitry for decoding these codes as described above can also be used to identify synchronization sequences in the received data, thereby providing economies in circuit implementation. It is also envisaged that these codes have advantageous properties for communication by techniques other than COFDM; thus, for example, they may be used as codes for code division multiple access (CDMA) techniques or for modem transmission of digital data over analogue communication paths.

What is claimed is:

1. A method of encoding data words comprising the step of encoding said data words as $2^m$-symbol code words where $m \geq 3$, each code word symbol having q different possible values where q is an even integer greater than 1, for transmission using multi-carrier frequency division multiplexing, such as coded orthogonal frequency division multiplexing (COFDM), wherein said data words are encoded in accordance with their value and code words selected in complete cosets, for a peak-to-mean envelope power ratio of said transmission not greater than a predetermined threshold of $2^{p+1}$ for any fixed integer p where $1 \leq p \leq m-2$, from a set of one or more cosets of a linear sub-code of a code having a generator matrix as follows:

| | | |
|---|---|---|
| $((2.0+1) \times 2^m)/2^m$ | $((2.1+1) \times 2^m)/2^m$ | ... |
| $((2.0+1) \times 2^{m-1})/2^{m-1}$ | $((2.1+1) \times 2^{m-1})/2^{m-1}$ | ... |
| | | ... |
| $((2.0+1) \times 2^y)/2^y$ | $((2.1+1) \times 2^y)/2^y$ | ... |
| | | ... |
| $((2.0+1) \times 2^1)/2^1$ | $((2.1+1) \times 2^1)/2^1$ | ... |
| $((2.0+1) \times 2^0)/2^0$ | $((2.1+1) \times 2^0)/2^0$ | ... |

| | | |
|---|---|---|
| $((2.z+1) \times 2^m)/2^m$ | ... | $((2.(2^m-1)+1) \times 2^m)/2^m$ |
| $((2.z+1) \times 2^{m-1})/2^{m-1}$ | ... | $((2.(2^m-1)+1) \times 2^{m-1})/2^{m-1}$ |
| $((2.z+1) \times 2^y)/2^y$ | ... | $((2.(2^m-1)+1) \times 2^y)2^y$ |
| $((2.z+1) \times 2^1)/2^1$ | ... | $((2.(2^m-1)+1) \times 2^1)/2^1$ |
| $((2.z+1) \times 2^0)/2^0$ | ... | $((2.(2^m-1)+1) \times 2^0)/2^0$ | where z has integer values from 0 to $2^m-1$, y has integer values from m to 0, x indicates bitwise multiplication of factors expressed as (m+1)-bit binary numbers, and the result of division is expressed as a single digit;

wherein all coset representatives of cosets in said set of cosets have the form $$(q/2)(X_1 * X_2) \oplus (q/2)(X_2 * X_3) \oplus \ldots \oplus (q/2)(X_{m-p-1} * X_{m-p}) \oplus$$
$$v_{1,1}(X_1 * X_{m-p+1}) \oplus v_{1,2}(X_2 * X_{m-p+1}) \oplus \ldots \oplus v_{1,m-p}(X_{m-p} * X_{m-p+1}) \oplus$$
$$v_{2,1}(X_1 * X_{m-p+2}) \oplus v_{2,2}(X_2 * X_{m-p+2}) \oplus \ldots \oplus v_{2,m-p}(X_{m-p} * X_{m-p+2}) \oplus$$
$$\ldots$$
$$v_{p,1}(X_1 * X_m) \oplus v_{p,2}(X_2 * X_m) \oplus \ldots \oplus v_{p,m-p}(X_{m-p} * X_m) \oplus$$
$$w_{1,2}(X_{m-p+1} * X_{m-p+2}) \oplus$$
$$w_{1,3}(X_{m-p+1} * X_{m-p+3}) \oplus w_{2,3}(X_{m-p+2} * X_{m-p+3}) \oplus$$
$$w_{1,4}(X_{m-p+1} * X_{m-p+4}) \oplus w_{2,4}(X_{m-p+2} * X_{m-p+4}) \oplus$$
$$w_{3,4}(X_{m-p+3} * X_{m-p+4}) \oplus$$
$$\ldots$$
$$w_{1,p}(X_{m-p+1} * X_m) \oplus w_{2,p}(X_{m-p+2} * X_m) \oplus \ldots \oplus w_{p-1,p}(X_{m-1} * X_m)$$

or a form derived therefrom by a permutation of the subscripts of the terms $X_1$ to $X_m$, where $X_1$ to $X_m$ are row labels of the first m rows in the generator matrix, terms of the form $v_{p,m-p}(X_{m-p}*x_m)$ indicate derivation of a word by symbol-wise multiplication of rows such as $X_{m-p}$ and $X_m$ followed by symbol-wise multiplication modulo q of such word by a respective coefficient such as $v_{p,m-p}$, p indicates symbol-wise addition of words modulo q, and the coefficients $v_{i,j}$ for $1 \leq i \leq p$ and $1 \leq j \leq m-p$ and the coefficients $w_{i,j}$ for $1 \leq i < j \leq p$ have integer values chosen from the range 0 to q–1.

2. The method of claim 1, wherein m is at least 4.

3. The method of claim 1, wherein q is divisible by 4 and the coefficients $v_{i,j}$ for $1 \leq i \leq p$ and $1 \leq j \leq m-p$ and the coefficients $w_{i,j}$ for $1 \leq i < j \leq p$ are chosen to be even.

4. The method of claim 1, wherein p=1 and all coset representatives of cosets in said set of cosets have the form $$(q/2)(X_1*X_2) \oplus (q/2)(X_2*X_3) \oplus \ldots \oplus (q/2)(X_{m-2}*X_{m-1}) \oplus v_1(X_1*X_m) \oplus v_2(X_2*X_m) \oplus \ldots \oplus v_{m-1}(X_{m-1}*X_m)$$

where $v_1 = v_{1,1}, v_2 = v_{1,2}, \ldots, v_{m-1} = v_{1,m-1}$.

5. The method of claim 4, wherein q=2.

6. The method of claim 3, wherein p=1 and all coset representatives of cosets in said set of cosets have the form $$(q/2)(X_1*X_2) \oplus (q/2)(X_2*X_3) \oplus \ldots \oplus (q/2)(X_{m-2}*X_{m-1})$$
$$\oplus 2v_1(X_1*X_m) \oplus 2v_2(X_2*X_m) \oplus \ldots \oplus 2v_{m-1}(X_{m-1}*X_m) \quad (5)$$

where the coefficients $v_1 = v_{1,1}/2$, $v_2 = v_{1,2}/2$, ..., $v_{m-1} = v_{1,m-1}/2$ have values in the range 0 to $(q/2)-1$.

7. The method of claim 6, wherein q=4.

8. The method of claim 5, wherein $m \geq 5$ and:

the combinations of values of coefficients $v_1, v_2, \ldots v_{m-1}$ are limited to combinations such that binary words of the form $v_1 v_2 \ldots v_{m-2} v_{m-1}$ have the property that each word $v_1 v_2 \ldots v_{m-2} v_{m-1}$ has Hamming weight of at least 4; and said permutations of subscripts of the terms $X_1$ to $X_m$ satisfy the condition that the subscript 1 is permuted to a value less than the value to which the subscript m−1 is permuted.

9. The method of claim 7, wherein $m \geq 5$ and:

the combinations of values of coefficients $v_1, v_2, \ldots v_{m-1}$ are limited to combinations such that binary words of the form $v_1 v_2 \ldots v_{m-2} v_{m-1}$ have the property that each word $v_1 v_2 \ldots v_{m-2} v_{m-1}$ has Hamming weight of at least 4; and said permutations of subscripts of the terms $X_1$ to $X_m$ satisfy the condition that the subscript 1 is permuted to a value less than the value to which the subscript m−1 is permuted.

10. The method of claim 5, wherein $m \geq 6$ and the combinations of values of coefficients $v_1, v_2, \ldots v_{m-1}$ are limited to combinations such that binary words of the form $v_1 v_2 \ldots v_{m-2} v_{m-1}$ have the following two properties:

each word $v_1 v_2 \ldots v_{m-2} v_{m-1}$ has Hamming weight of at least 4; and $$\sum_{i=0}^{\lfloor (m-3)/2 \rfloor} v_{i+1} 2^i < \sum_{i=0}^{\lfloor (m-3)/2 \rfloor} v_{m-1-i} 2^i.$$

11. The method of claim 7, wherein $m \geq 6$ and the combinations of values of coefficients $v_1, v_2, \ldots v_{m-1}$ are limited to combinations such that binary words of the form $v_1 v_2 \ldots v_{m-2} v_{m-1}$ have the following two properties:

each word $v_1 v_2 \ldots v_{m-2} v_{m-1}$ has Hamming weight of at least 4; and $$\sum_{i=0}^{\lfloor (m-3)/2 \rfloor} v_{i+1} 2^i < \sum_{i=0}^{\lfloor (m-3)/2 \rfloor} v_{m-1-i} 2^i.$$

12. The method of claim 4, wherein $q \geq 4$ and:

the combinations of values of coefficients $v_1, v_2, \ldots v_{m-1}$ are limited to combinations such that at least two of said coefficients have a value other than 0 and q/2; and said permutations of subscripts of the terms $X_1$ to $X_m$ satisfy the condition that the subscript 1 is permuted to a value less than the value to which the subscript m−1 is permuted.

13. The method of claim 4, wherein $q \geq 4$ and:

the combinations of values of coefficients $v_1, v_2, \ldots v_{m-1}$ are limited to combinations such that neither of the coefficients $v_1$ and $v_{m-1}$ has a value of 0 or q/2; and the coefficient $v_1$ is always chosen to be less than the coefficient $v_{m-1}$.

14. The method of claim 6, wherein $q \geq 8$ and:

the combinations of values of coefficients $v_1 v_2, \ldots v_{m-1}$ are limited to combinations such that at least two of said coefficients have a value other than 0 and q/4; and said permutations of subscripts of the terms $X_1$ to $X_m$ satisfy the condition that the subscript 1 is permuted to a value less than the value to which the subscript m−1 is permuted.

15. The method of claim 6, wherein $q \geq 8$ and:

the combinations of values of coefficients $v_1, v_2, \ldots v_{m-1}$ are limited to combinations such that neither of the coefficients $v_1$ and $v_{m-1}$ has a value of 0 or q/4; and the coefficient $v_1$ is always chosen to be less than the coefficient $v_{m-1}$.

16. The method of claim 1, wherein $p \leq m-4$ and:

$$\sum_{j=1}^{m-p} v_{1,j} q^{j-1} < \sum_{j=1}^{m-p} v_{2,j} q^{j-1} < \ldots < \sum_{j=1}^{m-p} v_{p,j} q^{j-1}$$

and each word $v_{i,1} v_{i,2} \ldots v_{i,m-p-1} v_{i,m-p}$ has Hamming weight of at least 4; and the coefficients $w_{i,j}$ for $1 \leq i < j \leq p$ have values q/2; and said permutations of subscripts of the terms $X_1$ to $X_m$ satisfy the condition that the subscript 1 is permuted to a value less than the value to which the subscript m−p is permuted.

* * * * *